Nov. 17, 1953

J. C. MOUZON 2,659,848

MEASURING APPARATUS

Filed Nov. 30, 1949

INVENTOR.
JAMES C. MOUZON

BY

ATTORNEY.

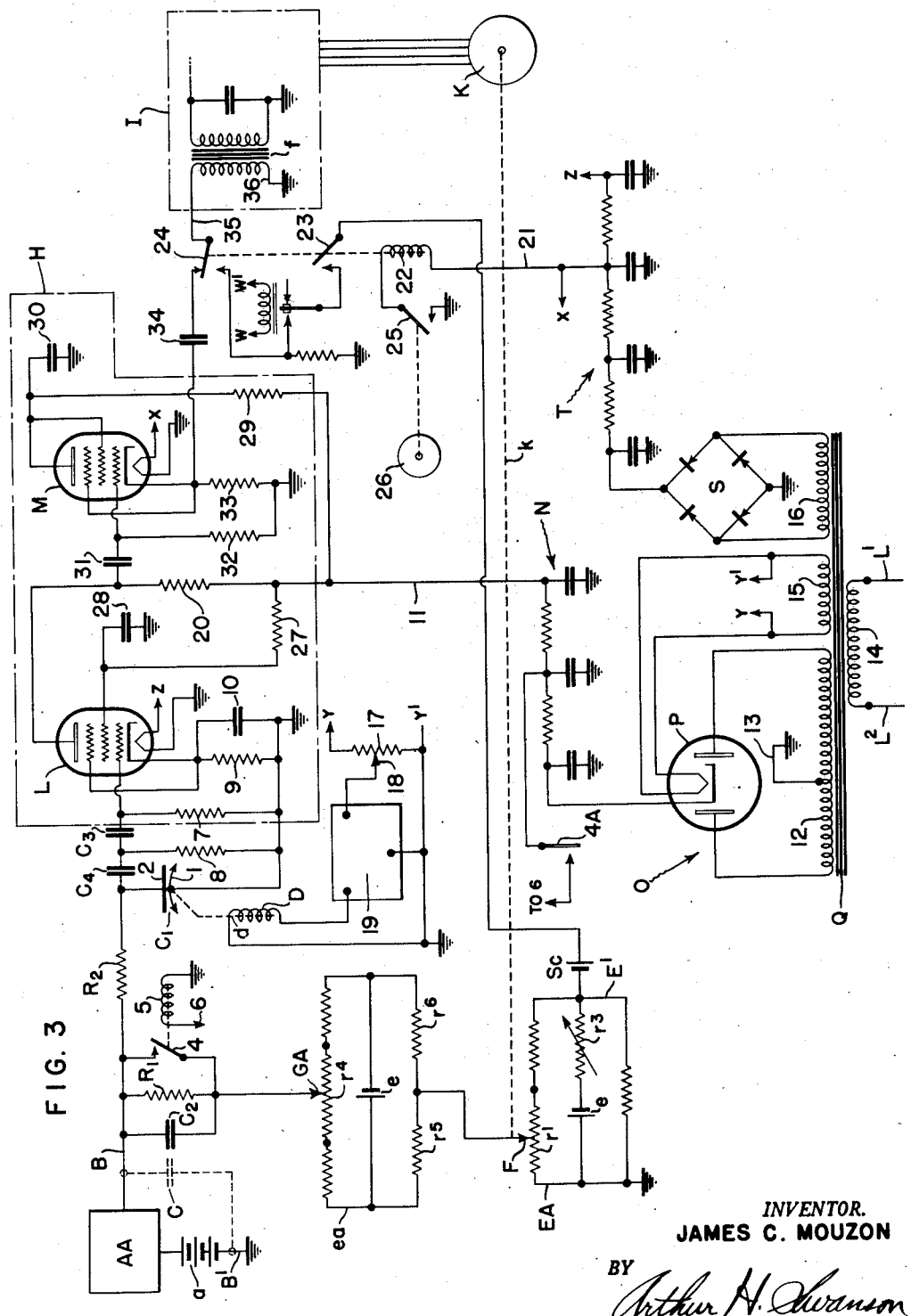

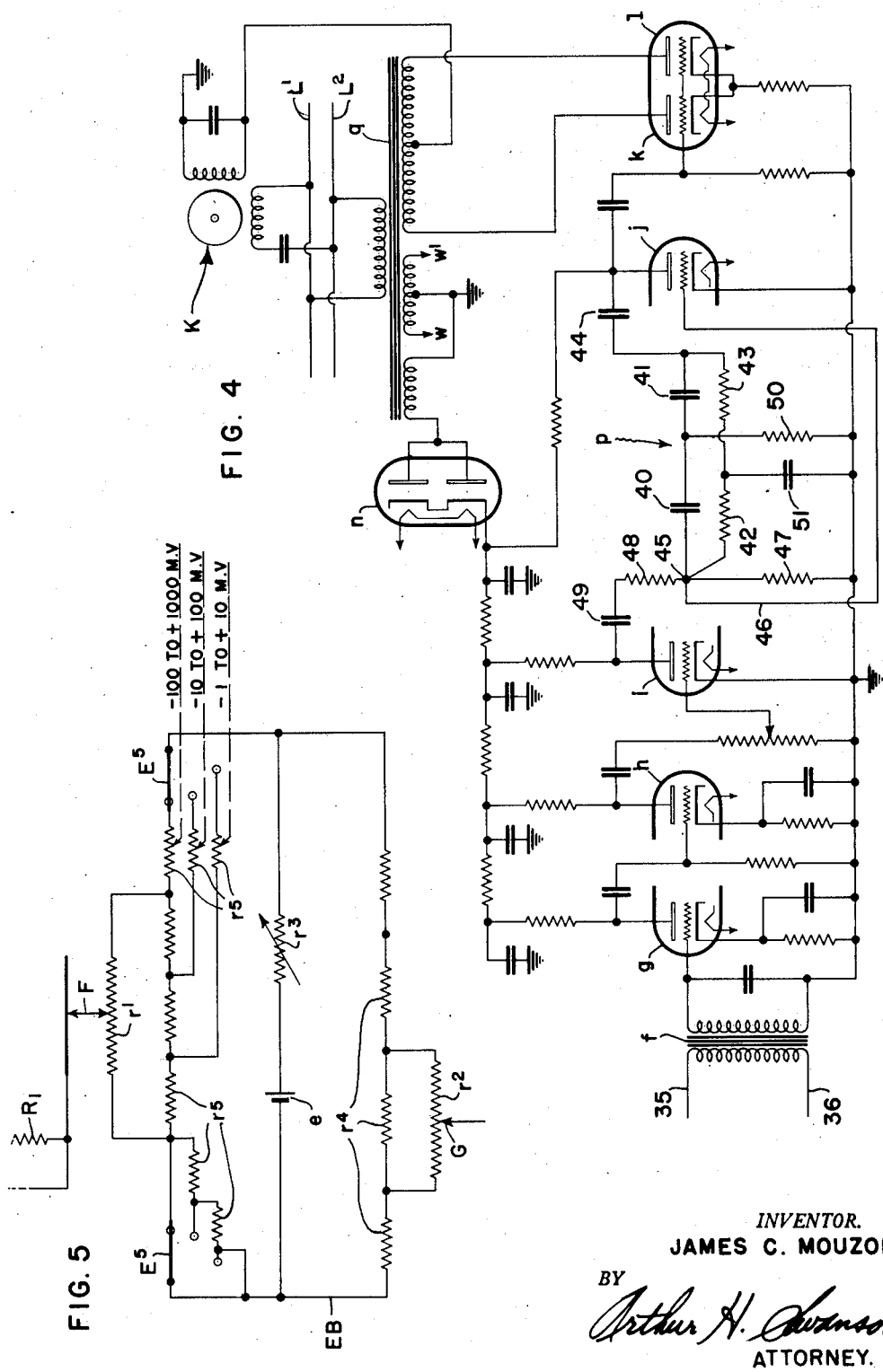

Patented Nov. 17, 1953

2,659,848

UNITED STATES PATENT OFFICE 2,659,848

MEASURING APPARATUS

James C. Mouzon, Chevy Chase, Md., assignor to Minneapolis-Honeywell Regulator Company, Minneapolis, Minn., a corporation of Delaware Application November 30, 1949, Serial No. 130,275

6 Claims. (Cl. 318—28)

The general object of the present invention is to provide an improved electrometer for measuring very small unidirectional electrical quantities. One specific object of the invention is to combine prior apparatus of the general type disclosed in the Wills Patent 2,423,540, of July 8, 1947, and now in general use for measuring small unidirectional electrical quantities such as variations in thermocouple currents, with other apparatus including a preamplifier to form an electrometer practically operative to measure unidirectional quantities very much smaller than can be measured by said prior apparatus. The present invention is adapted for use, for example, in monitoring radioactive areas and processes requiring the use of a sensitive electrometer having very good stability.

The apparatus disclosed in said Wills patent comprises a potentiometric measuring circuit in which a thermocouple or other source of unidirectional current to be measured is connected and produces a small unidirectional current signal when a change in the thermocouple voltage unbalances the measuring circuit. The apparatus disclosed in said patent also comprises vibratory contact apparatus converting the unidirectional signal, produced when the measuring circuit is unbalanced, into an alternating current signal, and comprises electronic voltage and power amplifying apparatus for amplifying said alternating current signal, and comprises means for using the amplified signal in selectively controlling the direction of operation of an electric motor which automatically adjusts the measuring circuit as required to rebalance that circuit when the latter is unbalanced. Ordinarily, said motor also actuates means for recording the varying values of the quantity measured, and it may also serve other purposes.

As is well known, the conversion of a small unidirectional signal into an alternating current signal, prior to its amplification, has been found necessary in prior apparatus, because of the instability and drift tendency of electronic apparatus used to amplify small unidirectional signals. The signal current variations produced by changes in thermocouple voltages commonly measured by prior apparatus, of the general type disclosed in said Wills patent, are of the order of $10^{-8}$ amperes. The present invention is devised and effective for use in measuring electronic quantities, such as currents produced by ionization chambers and hydrogen cells, which are of the order of, or even smaller than, $10^{-15}$ amperes, i. e., a billionth of a micro-ampere. The need for the conversion of a minute unidirectional signal into an alternating current signal preparatory to amplification, so as to minimize drift and to increase the stability of operation, increases as the magnitude of the signal diminishes. In accordance with the present invention, the conversion of the unidirectional signal into an alternating current signal is effected in the apparatus which I combine with the Wills patent apparatus, instead of in the last mentioned apparatus.

While the conversion apparatus used in the practice of the present invention may be regarded as replacing the conversion apparatus of the Wills patent, it is of a different type from the vibratory contact apparatus illustrated in said patent. The change in the type of conversion apparatus used is necessary because the contact resistance of a vibratory contact converter of the type disclosed in the Wills patent is too great to pass currents as small as those which the improved apparatus is designed to measure. The conversion apparatus included in my improved electrometer apparatus is of a known type in which the source of the unidirectional current signal to be measured is connected across a condenser and one plate of the condenser is vibrated relative to the other plate to increase and decrease alternately the distance between the plates at a suitable predetermined frequency. That frequency may well be, and is hereinafter assumed to be, 60 cycles per second. The alternate increases and decreases in the distance between the plates increases and decreases the capacity of the condenser, and produces an alternating current of said frequency. Mechanical energy is thus used to move the impressed charge in an electro-static field and is thus transformed into electric energy, and the alternating current signal produced is a measure of the charge impressed on the condenser.

A primary object of the invention is to include in the measuring apparatus motor damping means of a character effective to decrease rapidly the speed of the rebalancing motor as the balanced condition of the measuring circuit is closely approached, and an important object of the invention is to provide simple and effective condenser damping means for adding a damping component to the current signal in the output circuit of the vibratory condenser.

In the preferred form of the present invention, the vibratory condenser, the condenser damping means, and an electronic preamplifier form a preamplifying unit or section in which the minute unidirectional current signal to be measured is converted into an alternating current signal and is modified by the action of the damping condenser means and is initially amplified preparatory to its further amplification in the voltage amplifying and motor drive apparatus of a measuring and recording instrument of the general character disclosed in said Wills patent.

Since noise limits the sensitivity of a vibrating condenser electrometer, the band width should be made as narrow as possible to avoid overloading the amplifying apparatus. To this end, use is advantageously made of special provisions, disclosed in the Wild et al. Patent 2,475,576, of July 5, 1949, for eliminating 120 cycle and other random frequency signals from the output circuit of the voltage amplifier.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 3 is a circuit diagram illustrating the preamplifier of Fig. 1, combined with self-balancing measuring apparatus;

Fig. 4 is a circuit diagram illustrating a desirable form of the A. C. amplifier directly controlling the operation of the rebalancing motor of Figs. 1 and 3; and Fig. 5 is a diagram illustrating a modified form of the measuring bridge circuit.

Figure 1:
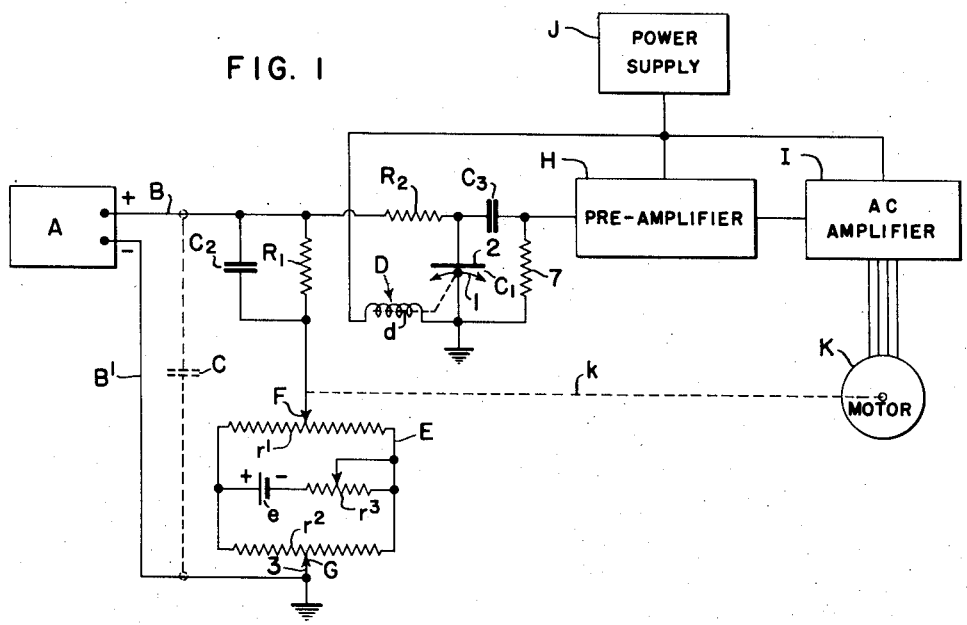
Fig. 1 is a schematic diagram illustrating essentials of the invention.

In the form of the invention illustrated schematically in Fig. 1, A represents a high impedance source of minute unidirectional current to be measured, such, for example, as an ionization chamber or a hydrogen cell. The source A has positive and negative output terminals B and B'. The negative terminal B' is connected directly to ground. The positive terminal B is connected to ground through a measuring circuit including a measuring resistor $R_1$ of very high resistance, and a regulable source of voltage E. As shown, the resistor $R_1$ has one end directly connected to the terminal B, and has its other end connected to ground through the regulable source of voltage E which ordinarily is a D. C. voltage divider or potentiometer. The terminal B is also connected to ground through a resistor $R_2$ of high resistance, and conversion apparatus comprising a vibratory condenser $C_1$. The latter, as diagrammatically shown in Fig. 1, comprises a movable lower plate or element 1 connected to ground, and a stationary plate or element 2 connected to the terminal B through the resistor $R_2$. An electromagnetic device comprising a coil D and a core or armature $d$ has its coil D connected to a source of alternating current for energizing the coil, and the armature $d$ is mechanically connected to the movable plate or element 1 of the condenser $C_1$. The armature $d$ is magnetically polarized and oscillates with the frequency of the alternating current which energizes the coil D, and thus causes the movable condenser element 1 to move alternately toward and away from the condenser element 2 with the frequency of the alternating current.

In the preferred form of the invention, the frequency of vibration of the condenser $C_1$ is the frequency of the alternating current used in energizing the coil D to produce the vibration, and the vibrating structure is designed to have a natural mechanical or resonant frequency substantially different from the energizing current frequency. For example, the resonant frequency may well be 80 cycles per second when the energizing current frequency is 60 cycles per second as it may well be, and is, in the present use of the invention. With such a substantial difference between the two frequencies, there are no such phase displacements and no such variations in the amplitude of vibration as may be expected to result from slight variations in the alternating current frequency when that frequency and the resonant frequency of the vibrating structure are nominally the same.

The mechanism for vibrating the movable condenser plate may take various forms, but preferably is of a character to insure a stable and relatively small amplitude of vibration, and of a type and form to minimize noise and other undesirable effects of stray electromagnetic and electrostatic forces. A desirable form of vibrating mechanism is disclosed and claimed in the concurrently filed application of Frederick W. Side, Serial No. 130,316. In the vibrating condenser disclosed in said appliaction, the movable condenser plate is one inch in diameter and about .04 of an inch thick, and, in operation, the distance between the movable plate and the stationary plate varies from a minimum of about .002 of an inch, and a maxmium of about .04 of an inch.

A damping condenser $C_2$ is connected in parallel with the measuring resistor $R_1$ and constitutes a highly important element of the invention. The condenser $C_2$ cooperates with the resistor $R_1$ to add a damping current component to the signal amplified in the amplifiers H and I, and also expedites the instrument response to a change in the source output current by expediting the charging and discharging actions of the inherent capacity C of the current source A.

The voltage source E in the simple form shown diagrammatically in Fig. 1 is a split potentiometer or bridge circuit which comprises a measuring slide wire resistor $r'$ engaged by a slider contact F through which the resistor $R_1$ is connected to the bridge E. The bridge E includes a second slide wire resistor $r^2$ connected in parallel with the resistor $r'$. As shown, the bridge also includes an energizing battery $e$ or other source of unidirectional current and a battery calibrating resistor $r^3$, the battery $e$ and resistor $r^3$ being connected in series with each of the resistors $r'$ and $r^2$. A slider contact G is connected to one end of a conductor 3 which has its other end grounded, and engages and is adjustable along the resistor $r^2$ to effect a zero point calibration adjustment hereinafter explained.

Figure 2:
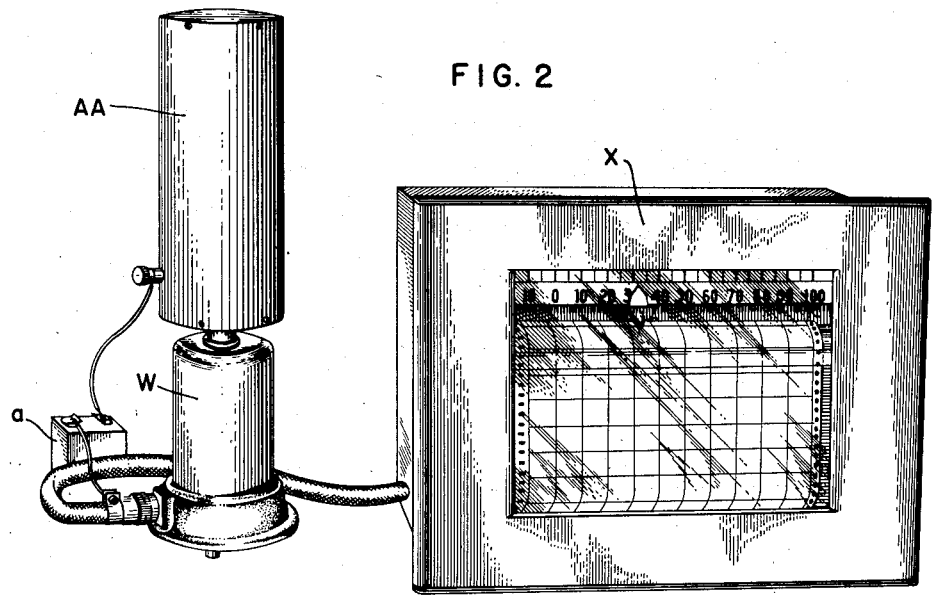
Fig. 2 is a perspective view illustrating a desirable form of the improved measuring apparatus.

The terminal conductor B is connected through the resistor $R_2$ and a capacity coupling device to preamplifier apparatus H, and is connected through the latter to a main voltage amplifier and motor drive mechanism I. In Fig. 1, the capacity coupling of the resistor $R_2$ to the preamplifier H is shown as comprising a single condenser $C_3$. In practice, however, for reasons hereinafter stated, the capacity coupling comprises two condensers $C_3$ and $C_4$, connected in series as shown in Fig. 3 between the terminal B and the control grid of the preamplifier amplifying valve L. An electric current power supply device J supplies energizing current to the coil D, to the preamplifier and amplifier sections H and I, and to the motor K. The latter is controlled by the apparatus I and operates through a suitable mechanical connection $k$ to adjust the contact F along the slide wire resistor $r'$ if and when such adjustment is necessary to maintain the potential of the contact F equal in magnitude and opposite in direction to the potential of the output terminal B of the device A. The voltage and motor drive amplifier I and the motor K may be, and as shown in Fig. 2 are, included in the measuring and recording instrument X shown in Fig. 2, and may be of the general form shown diagrammatically in said Wild et al. patent and shown in Fig. 4 hereof.

The present invention is characterized by the small bulk and relatively inexpensive character of the apparatus which is combined with a known type of commercial self-balancing potentiometric instrument to provide means practically effective to measure electric currents very much smaller than can be measured with said self-balancing instrument alone. The relative sizes of the essential apparatus components of a commercial form of the invention is made apparent in Fig. 2 which is a scale reproduction of a photograph of such an apparatus. The apparatus shown in Fig. 2 consists of three structural units AA, W and X. The unit AA is an ionization chamber and together with a series connected battery $a$ corresponds to the device A of Fig. 1. The voltage of battery $a$ is not critical and depends upon the ionization chamber design. In the disclosed embodiment of the invention, a battery $a$ of 67½ volts was employed, but the voltage could well be much lower or much higher. The unit W includes all of the apparatus shown diagrammatically in Fig. 1, except the bridge E, power supply J, amplifier I, and motor K, and the unit X of Fig. 2 includes all of the apparatus collectively shown in Figs. 1, 3 and 4 not included in the units AA and W. The element X apparatus is all housed in the casing of a standard commercial self-balancing potentiometric measuring instrument of the type in wide use in this country and known as the "ElectroniK" potentiometer. By way of illustration and example, it is noted that, in the commercial apparatus illustrated in Fig. 2, the unit W is six inches high and less than four and one half inches in diameter.

The chief cause of instability in an electrometer of the type disclosed herein is a variation with time, or "drift," of the contact potential or difference between the open circuit potentials of the two vibrating condenser plates. As is known to those skilled in the art, it is not practically possible to construct and maintain the plates of a condenser in such condition that the two plates will be at the same potential when the condenser is in an open circuit. The difference in the potentials of the plates, when the condenser is in an open circuit, is commonly referred to as the "contact potential" of the condenser. The existence of contact potential is due to the fact that the surfaces of the two condenser plates have different work functions, i. e., that the forces opposing the escape of electrons from the two elements at their surfaces are unequal. The result of the work function differences, or contact potential, of a condenser is that the latter holds a charge when in an open circuit. Contact potential difficulties may be minimized by care in forming the vibrating condenser plates with smooth surfaces and by coating or plating them with gold, or by plating them with rhodium as explained in the concurrently filed application for patent of Harry Reese, Serial No. 130,285. The mere existence of the contact potential of the condenser $C_1$ would be of little importance if it were constant, as it could then be readily balanced out, or compensated for, by a suitable zero adjustment in the initial calibration of the apparatus. In practice, however, the contact potential is not constant, and it is necessary to recalibrate the apparatus periodically to minimize suitably the effect of contact potential drift. The frequency with which such calibration is required depends upon the sensitivity and the degree of accuracy demanded. With the arrangement of my present invention, recalibration is needed no oftener than once a month in some applications and once a week or once a day in other applications.

With the apparatus shown in Fig. 1, the contact potential is balanced out, or compensated for, by adjusting the contact G along the slide wire resistor $r^2$ until the potential of the contact F is equal in magnitude and opposite in sign to the contact potential of the condenser $C_1$ when the contact F is in engagement with the neutral or normal zero point along the length of the resistor $r'$. In that condition of the apparatus, the only voltage applied to the condenser $C_1$ is the potential difference between the contact F and ground, i. e., a voltage equal in magnitude and opposite in polarity to the contact potential of the condenser $C_1$, which is thus balanced out. In practice, the balancing out of the contact potential of condenser $C_1$ may be effected, when the resistors $R_1$ and $R_2$ are disconnected from the current source A, by manually adjusting the contact G into the position in which the feedback signal applied to the condenser $C_1$ causes the motor K to adjust the contact F into its neutral or normal zero position. No means for short circuiting the resistor $R_1$ is shown in Fig. 1, but, in the circuit arrangement shown in Fig. 3, the closure of the switch 4 short circuits the resistor $R_1$.

In Fig. 3, the single bridge E of Fig. 1 is replaced by separate measuring and compensating bridges EA and $ea$, respectively. The measuring bridge EA differs from the bridge circuit E essentially only in that it includes no adjustment provisions analogous to those collectively formed by the resistor $r^2$ and slider contact G. In Fig. 3, zero adjustments to compensate for the contact potential of the condenser $C_1$ are effected by adjusting a slider contact GA along a slide wire resistor $r^4$ of the bridge $ea$. The latter is shown as of conventional potentiometric bridge type, and has the slide wire resistor $r^4$ in one branch, and has resistors $r^5$ and $r^6$ in a parallel branch, of the bridge circuit. Each of said branches is connected in series with a bridge energizing battery $e$, and the connected ends of the resistors $r^5$ and $r^6$ are connected to the slider contact F which engages the slide wire $r'$ of the measuring bridge EA. The condenser $C_2$ and resistor $R_1$ of Fig. 3 are thus normally connected to the slider contact F of the bridge EA, through the contact GA and bridge $ea$. When, with the resistor $R_1$ short circuited, the adjustment of the contact GA along the resistance $r^4$ is that required to neutralize the contact potential of the condenser $C_2$, the contact F may be adjusted into its zero or neutral position along the resistor $r^1$ by the motor K.

In Fig. 3, a normally open switch 4 serves, when closed, to short circuit the resistor $R_1$ and the condenser $C_2$. The switch 4 is closed and opened by electro-magnetic device 5. The winding of the device 5 has one terminal grounded and has its other terminal 6 connected to a manually actuated energizing switch 4A, which, as seen in Fig. 3, forms a part of the apparatus shown in Fig. 3 and located in the instrument X of Fig. 2.

The use of the two coupling condensers $C_3$ and $C_4$ illustrated in Fig. 3 avoids the objection, inherent in the use of a single coupling capacitor $C_3$ as shown in Fig. 1, that voltage appearing across the grid leak resistor 7 puts a charge on condenser $C_1$ and thereby causes the latter to create a false control signal. In Fig. 3, the condenser $C_4$ is interposed between the resistor $R_2$ and the condenser $C_3$, and the connected terminals of the condensers $C_3$ and $C_4$ are connected to ground by a resistor 8 having high resistance. Since the capacitance of the coupling capacitor $C_3$ of Fig. 1 is ordinarily about the same as the capacitance of the vibrating capacitor $C_1$, the charge put on the condenser $C_1$ by the voltage across the grid leak resistor 7 results in substantial measurement errors in some cases. Such errors are avoided when two coupling condensers $C_3$ and $C_4$ are used as shown in Fig. 3, since the entire voltage across the grid leak resistor 7 then appears across the coupling capacitor $C_4$, inasmuch as the other side of that capacitor is grounded by the resistor 8.

In Fig. 3, as in Fig. 1, the resistor $R_1$ and condenser $C_2$ cooperate to provide a desirable damping action tending to eliminate, or materially reduce, over-travel of the rebalancing motor K in the final portion of each rebalancing operation, without greatly affecting the speed of the motor response to a variation in the output current of the source A. The condenser $C_2$ in parallel with the resistor $R_1$ provides delay in the changes in the motor driving signal, resulting from the changes in the output current of the source A, so that full effect on the measuring apparatus of a change in the output current of the device A is delayed, thereby to stabilize the measuring system and eliminate or reduce motor overshooting. The capacity of the condenser $C_2$ needed for optimum damping results depends upon the capacity C in the output circuit of the current source A between the output terminal B and the grounded terminal B'. As is indicated by dotted lines in Figs. 1 and 3, the capacity C is effectively in shunt to the measuring apparatus input circuit which includes the resistor $R_1$, condenser $C_2$, and their bridge circuit connections to ground.

The magnitude of said capacity C is dependent upon physical characteristics of the output circuit of the device A. When the device A is an ionization chamber directly mounted on the preamplifier structure, as shown in Fig. 2, the input capacity C may be of the order of 200 mmf., but under other conditions, and in particular where a substantial length of coaxial cable is included in the connection between the device A and the preamplifier H, the input capacity C may be of the order of 1000 to 2000 mmf. The condenser $C_2$ should have its capacity related generally to the value of the capacity C so as to enable the condenser $C_2$ to serve as a low impedance discharge means for the capacity C. Such low impedance discharge means permits the capacity C charge to vary much more rapidly on a change in the voltage between the terminals B and B' than it could if the only discharge paths for the the capacity C charge were the high impedance paths formed by the source A structure and by the circuit including the very high resistor $R_1$ and the second resistor $R_2$. In practice, it is not contemplated that the resistance $R_1$ will ever be higher than 100,000 megohms, but higher resistance values may be utilized, if stable, and lower resistance values may also be utilized. The second resistor $R_2$ may well have a resistance value of the order of 5000 megohms.

In practice, when the capacity C is of the order of 200 mmf., the capacity of the condenser $C_2$ may well be about 10 to 15 mmf., and the time constant of the $C_2R_1$ circuit will then be about one second, with the result that the speed of the response of the measuring apparatus will then depend primarily on the speed of the motor K. When the capacity C is of the order of 1000 to 2000 mmf., a desirable capacity of the condenser $C_2$ will be of the order of 200 to 350 mmf., and the time constant of the $C_2R_1$ circuit may then be as high as twenty seconds. In such case, the speed of the measuring apparatus will depend on the characteristics of the measuring circuit, and particularly on the capacity of the condenser $C_2$ and not on the speed of the motor K.

In considering the damping effect of the condenser $C_2$, it should be borne in mind that, in the balanced condition of the measuring apparatus, the voltage drop from the slide wire contact F to ground is equal and opposite to the voltage drop across the resistor $R_1$. In consequence, there is then no potential difference between the terminals B and B', and therefore no charge on the vibrating condenser $C_1$. Thus, no signal is then generated to drive the motor K. On a change in the current flow in the ionization chamber AA, a potential difference is produced between the terminals B and B', and the measuring circuit is unbalanced. That potential difference produces a current flow in the resistor $R_2$ with a result that an electrical charge is put on the condenser $C_1$. The charge then put on the condenser $C_1$ causes the latter to transmit a motor drive signal through the amplifying apparatus to the motor K, starting the latter in operation to adjust the slider contact F and to vary the position of the latter as required to make the voltage drop from the slide wire contact F to ground equal and opposite to the voltage drop across the resistor $R_1$ and thus rebalance the measuring circuit. Because of the action of condenser $C_2$ in inhibiting changes in the voltage drop across the measuring resistor $R_1$, a damping effect is caused to be transmitted through the amplifier to the motor K, as balance is approached, which damping effect causes the rotation of the motor K to be interrupted sooner than it otherwise would be. Said damping effect prevents or reduces over-travel of the motor as balance is attained.

The preamplifier illustrated in Fig. 3 comprises two electronic valves L and M. The latter are shown as pentodes, and may well be of the commercially available 6AK5 type, though valves of other types may be used. The cathode of the valve L is connected to ground by a resistor 9 connected in parallel with a condenser 10. Anode current is supplied to the valves L and M through the output terminal 11 of a filter N in the output circuit of a rectifier O. The latter is shown as a full wave rectifier including an electronic valve P having two anodes and a single cathode. The input of the filter N is connected to the cathode of the rectifier valve P. One anode of the valve P is connected to one end, and the other anode to the second end, of the secondary winding 12 of a transformer Q. The winding 12 has a center tap 13 connected to ground. The transformer Q has its primary winding 14 connected to alternating current supply conductors L' and L² through which the winding 14 is connected to a source of alternating current of suitable frequency, assumed to be 60 cycles per second. The voltage between the grounded center tap connection 13 and each of the anodes of the valve P may well be 125 volts.

The transformer Q includes additional secondary windings 15 and 16. The secondary winding 15 furnishes the voltage, which may be 6.3 volts, for supplying filament current to the cathode heating element of the valve P, and through its terminals Y and Y' supplies energizing voltage to a potentiometer resistor 17 through which the vibrator coil D is energized. As diagrammatically shown in Fig. 3, one terminal of the potentiometer resistance 17 is connected to one terminal of the coil D and to ground. A slider contact 18 engaging and adjustable along the potentiometer resistor 17 is connected to the ungrounded terminal of the coil D through a phase shifting network shown diagrammatically by the block 19 but including suitable capacitive and/or inductive components for synchronizing the vibration of the vibrating condenser $C_1$ with the current variations of the supply lines L' and L². By adjustment of the slider contact 18 along the resistor 17, the energizing current supplied to the coil D may be regulated as conditions make desirable.

The secondary winding 16 of the transformer Q supplies alternating current at a suitable voltage, which may be 16.5 volts, to the energizing terminals of a rectifier bridge S which may be of the copper oxide type. One of the output terminals of the rectifier bridge S is connected to ground and the other is connected through a filter T and its outlet terminal 21 to the actuating coil 22 of an electro-magnetic switch. The latter comprises movable contacts 23 and 24, which are automatically adjusted, when the coil 22 is energized, to change the circuit network from its normal operation condition to the condition for recalibration. The energization of the coil 22 is effected by the closure of a switch 25 which, when closed, grounds the terminal of the coil 22 not connected to the filter T. The switch 25 is opened and closed by a periodically operating actuator 26. In the practical use of the invention now being made, the closure of the switch 25 initiates the operation of automatic recalibration mechanism of known type, including a standard cell Sc connected to the terminal E' of the bridge EA, through which mechanism the motor K or a special recalibrating motor adjusts the resistance $r^3$ and thereby regulates the value of the current flowing through the measuring slide wire $r'$.

The filter T has a branch outlet X which supplies current to the cathode heating element of the valve M, and has another outlet Z which supplies energizing current at a lower voltage to the cathode heating element of the valve L. The anode of the valve L is connected to the conductor 11 by a resistor 20. The screen grid of the valve L is connected to the conductor 11 by a resistor 27 and is connected to ground by a condenser 28. The anode of the valve M is connected to the supply conductor 11 through a resistor 29 and is connected to ground by a condenser 30. The control grid of the valve M is coupled by a condenser 31 to the anode of the valve L, and is connected to ground by a grid leak resistor 32. The cathode of the valve M is connected to ground by a resistor 33. Each of the valves L and M has its suppressor grid directly connected to the cathode of the valve. The screen grid of the valve M is directly connected to the anode of the valve. The cathode of the valve M is normally connected by a condenser 34 and switch element 24 to the input terminal 35 of the amplifier I. The second input terminal 36 of the amplifier I is connected to ground and is thereby connected to the grounded end of the cathode resistor 33 of the valve M. With the switch member 24 in its normal position, shown in Fig. 3, the potential drop in the resistor 33 constitutes an alternating current control signal impressed on the input circuit of the amplifier I, and thus controls the rebalancing operations of the motor K.

The circuit elements associated with the valve M are so chosen and proportioned that the effective input capacitance and the effective output impedance of the valve M are each so relatively low that the valve M serves in effect as a cathode follower stage for the valve L, so that the latter constitutes the single amplification stage of the preamplifier H.

In the practical use of the apparatus shown diagrammatically in Fig. 3, significant resistance and capacitance values may be as follows:

Resistance of resistor $R_1$ is 100,000 megohms
Resistance of resistor $R_2$ is 5,000 megohms
Resistance of resistor 7 is 5,000 megohms
Resistance of resistor 8 is 5,000 megohms
Resistance of resistor 9 is 10,000 ohms
Resistance of resistor 20 is 0.56 megohms
Resistance of resistor 27 is 1.8 megohms
Resistance of resistor 29 is 68,000 ohms
Resistance of resistor 32 is 1.8 megohms
Resistance of resistor 33 is 470 ohms Capacitance of condenser $C_1$ at rest is 20 micromicrofarads
Capacitance of condenser $C_3$ is 30 micromicrofarads
Capacitance of condenser $C_4$ is 15 micromicrofarads
Capacitance of condenser 31 is .01 microfarads
Capacitance of condenser 10 is 25 microfarads
Capacitance of condenser 28 is .1 microfarads
Capacitance of condenser 30 is 10 microfarads
Capacitance of condenser 34 is 25 microfarads As diagrammatically shown in Figs. 3 and 4, the input terminals 35 and 36 of the voltage amplifier and motor drive unit I are the terminals of the primary winding of a coupling transformer $f$. The secondary winding of the transformer $f$ has one terminal connected to ground and has its other terminal connected to the control grid of a valve $g$ constituting the first voltage amplifier stage of the amplifier and motor drive unit I. The voltage amplifier comprises second, third and fourth stage amplifier valves $h$, $i$ and $j$, respectively. The anodes of each of the valves $g$, $h$, and $i$ are condenser coupled to the control grids of the valves $h$, $i$ and $j$, respectively. The valve $j$ has its anode coupled by a condenser to the control grid of each of motor drive valves $k$ and $l$. The anode of the valve $k$ is connected to one end, and the anode of the valve $l$ is connected to the second end, of the secondary winding of a transformer $q$ which has its primary winding connected across branches of the previously mentioned conductors L' and L². The cathodes of the various valves $g$, $h$, $i$, $j$, $k$ and $l$, are suitably connected to ground. Anode current is supplied to the anodes of the valves $g$, $h$, $i$ and $j$ through a filter connected to the cathode of a diode rectifier $n$, to which anode current is supplied by a second secondary winding of the transformer $q$. A third secondary winding of the transformer $q$ having terminals $w$ and $w'$ supplies heating current to the cathode heater elements of the different valves $g$, $h$, $i$, $k$, $l$ and $n$, and also to the operating coil of the vibrating contactor in the input circuit of the amplifier I, as seen in Fig. 3, which is employed for the purpose of automatically standardizing or recalibrating the measuring circuit.

The apparatus shown in Fig. 4 comprises a parallel-T, resistance-capacitance, frequency selective network $p$ of known type connected between the anode and the control grid of the valve $j$. Said network is referred to, commonly, and hereinafter, as a "Parallel T RC filter network." Except for its inclusion of the last mentioned network, the apparatus shown in Fig. 4 does not differ in principle from the apparatus disclosed in the aforementioned Wills patent, except that in the Wills patent the transformer $f$ couples the voltage amplifier unit I directly to a vibrating contact converter instead of to a pre-amplifier such as the pre-amplifier H. The apparatus shown in Fig. 4 also differs in form from the Wills apparatus by its inclusion of the rectifier $n$, and also by the fact that the Wills patent amplifier includes three voltage amplifier stages only, instead of the four stages $g$, $h$, $i$ and $j$ of Fig. 4. The previously mentioned Wild et al. patent includes the fourth amplifier stage $j$ and the network $p$ and every other feature shown in Fig. 4. No need appears for further description of the features of the circuit network shown alike in Fig. 4 and in each of the Wills and Wild et al. patents. As those skilled in the art will understand, the fourth voltage amplifier stage and the network $p$ are not essential to the utilization of the present invention and may be dispensed with in many cases, if desired.

The parallel T RC network $p$ shown in Fig. 4 comprises a pair of condensers 40 and 41 connected in parallel with a pair of resistors 42 and 43 which are connected in series with one another. The connected terminals of the condenser 41 and the resistor 43 are connected to the anode of the valve $j$ by a condenser 44. The connected terminals of the condenser 40 and resistor 42 are connected at the junction point 45. The junction point 45 is connected by a conductor 46 to the control grid of the valve $j$, is connected to ground by a resistor 47, and is connected to the anode of the valve $i$ through a resistor 48 and a condenser 49. The connected terminals of the condensers 40 and 41 are connected to ground through a resistor 50, and the connected terminals of the resistors 42 and 43 are connected to ground by a condenser 51.

The parallel T RC network has such circuit component values that it is tuned to attenuate 60 cycle signals, while passing 120 cycle signals and signals of other frequencies. In consequence, the device $p$ operates to feed back from the plate circuit to the control grid of the valve $j$ all signals having frequencies other than 60 cycles, but does not feed back 60 cycle signals to any great extent. Since the plate and grid signals of the amplifier valve $j$ are inherently 180° out of phase with each other, the signals fed back to the plate circuit from the grid of the valve J oppose corresponding signals which the output circuit of the valve $i$ impresses on the input circuit of the valve $j$. This results in a substantial reduction of signals other than 60 cycle signals reaching valves $k$ and $l$ from valve $j$. The reduction of 120 cycle signals and stray signals of frequencies other than 60 cycles substantially eliminates the undesirable effects which would otherwise be produced by those signals.

For its purpose in attenuating 60 cycle signals while freely passing and feeding back other signals, circuit elements of the parallel T RC filter network may have values approximately as follows: The condensers 40 and 41 may each have a capacity of 0.00025 microfarad; the condenser 51 may have a capacity of 0.005 microfarad; the resistors 42 and 43 may each have a resistance of about one megohm; and the resistor 50 may have a resistance of about one-half megohm. As will be apparent, the use of the parallel T RC filter network is of a special utility and value, as used herein, because of the unusually great need in the apparatus disclosed herein for high sensitivity and stability.

The apparatus shown in Fig. 3 can be adapted for use in measuring currents varying from a value as small as about $10^{-15}$ amperes to currents as large as $10^{-5}$ amperes. To adapt the apparatus to such widely different measuring ranges, interchangeable use may be made of a plurality of measuring or input resistors $R_1$ having resistance values varying in inverse order to the variations in the current to be measured, from a minimum of about 100 megohms to a maximum of about 100,000 megohms.

To obtain suitable instrument scale readings with widely different values of the quantities measured, in lieu of the measuring bridge circuit E or EA of Figs. 1 and 3, use may well be made of the bridge circuit EB of Fig. 5, which includes a decade range switch arrangement of well known type. In Fig. 5, the slide wire resistor $r'$ is connected in shunt to an adjustable branch of the bridge circuit EB, including a plurality of resistor sections $r^5$. The latter may be operatively connected in the bridge circuit in various arrangements by manual adjustments of switch members $E_5$ thereby to vary the potential drop in the slide wire resistor $r'$ relative to the potential difference between the ends of the bridge circuit energizing branch which includes the battery $e$ and the regulating resistance $r^3$. In the circuit arrangement shown in Fig. 5, the switches $E_5$ may be adjusted to provide any one of three scale ranges, namely a scale range of from −1 to +10 millivolts; a second scale range of from −10 to +100 millivolts, and a third scale range of from −100 to +1000 millivolts. The resistance values of the resistor sections $r^5$ and the manner in which the different resistors are associated by the manipulation of the switches $E^5$ need not be further described, since the use of such decade switch arrangements is well known, and the details of the arrangement shown in Fig. 5 include nothing claimed as novel herein.

In the contemplated operation of the apparatus, the current from the high impedance source A of Fig. 1 or AA of Fig. 3 will flow through the resistor $R^1$ and through the voltage source E of Fig. 1 or $ea$ and EA of Fig. 3 to ground. Since the resistance of the input resistor $R_1$ is of the order of, or higher than, $10^{10}$ ohms, and the resistance of the measuring circuit is about 200 ohms, most of the voltage drop due to such current flow will appear across the resistor $R_1$. Because of the low resistance of the measuring circuit, it produces a negligible voltage effect from the exceedingly small current from the high impedance source.

When the measuring circuit is unbalanced and an electrical charge is placed on the vibrating condenser $C_1$, the vibrating condenser then generates an A. C. signal, since its capacitance is varying with time. The A. C. signal is amplified by the preamplifier H, and is further amplified by the amplifier I. The output of the amplifier causes rotation of the two-phase rebalancing motor K which adjusts the slider contact F and also drives the indicator and pen recorder. Since the phase of the A. C. signal from the vibrating condenser depends on the polarity of the D. C. signal impressed on it, the motor then rotates in the direction to balance the system. When the system is balanced, the voltage from the slide wire contactor F to ground is equal and opposite to the voltage across the resistor $R_1$, so that the voltage between the upper end of said resistor and ground is zero, and no charge appears on the vibrating condenser. Thus, there is then no signal generated to drive the motor. The power supply shown in the diagram block J of Fig. 1 is located in the instrument section X, and supplies D. C. plate and filament voltages to the preamplifier, as well as A. C. voltage to drive the vibrating condenser $C_1$.

A zero adjustment of the slider contact G of Fig. 1 or GA of Fig. 3 may be made when necessary to compensate for the contact potential of the vibrating condenser. Any difference in the work functions of the two condenser plates will result in a charge on the condenser $C_1$ and a tendency to a zero displacement which may be compensated for by a potentiometer adjustment of the contact G or GA.

As previously explained, the vibrating structure of the vibrating condenser has been designed with a resonant frequency of approximately 80 cycles per second, so that with the actual 60 cycle vibration frequency there will be little or practically no change in the phase of the output signal due to changes in line frequency, whereas, if the vibrating condenser were operating at resonant frequency, a very large change in phase of the output signal would be produced by a small change in line frequency. Maintenance of phase relationships is very important with the two-phased rebalancing motor used, as its torque output is dependent upon the relative phases of the voltages on the two windings.

In the commercial use of the present invention heretofore made, the largest input resistor resistance used has been one hundred thousand megohms, as resistors of substantially higher resistance were sometimes found noisy and erratic. With a resistor $R_1$ of one hundred thousand megohms resistance, an instrument measurement span of 11 millivolts is obtainable, in ordinary use, in measuring current of $10^{-13}$ amperes. In practice, such sensitivity is sufficient for most applications where a steady deflection type of instrument is needed. The sensitivity of the instrument can be extended to $10^{-16}$ amperes by using the "rate-of-charge" method of measuring. The steady deflection type of indication is practically desirable, however, because it permits the use of limit switches to operate at a predetermined current level, corresponding to a selected level of radiation when the electrometer is used with an ionization chamber, and avoids the computing and timing required in the use of the rate-of-charge method. Another advantage is that the magnitude of the current is indicated almost immediately when the damping action of the condenser $C_2$ is such that the speed of indication is limited only by the speed of response of the instrument.

Since noise limits the sensitivity of a vibrating condenser electrometer, the band width should be made as narrow as possible. The previously described use of the parallel T network $p$ contributes to a desirably narrow band which is important, since, although the motor is two phase and responds only to 60 cycle signals, any frequency is capable of overloading the amplifier and causing decreased sensitivity.

In the electrometer shown in Fig. 3, the first stage of amplification of the preamplifier is the critical one. In present practice, the first stage amplifier tube L is of the commercially available 6AK5 type, with a filament voltage of about 4½ volts, and a plate voltage of about 35 volts. This tends to make the input impedance high enough to provide good sensitivity, but low enough to be obtainable with a tube of standard type. An input impedance of ten thousand megohms is sufficient. A lower impedance than this will lower the sensitivity, but will not affect the position of the null balance. Thus, the tube performance is not nearly as critical as in a D. C. electrometer input tube.

The preamplifier second stage valve M is also of the 6AK5 type, arranged to act as a cathode follower which serves to step-down the high output impedance of the first stage to a low input impedance which will nearly match the low input impedance of the well known A. C. amplifier employed in the self-balancing potentiometer type of instrument disclosed in the said Wills patent. The second stage amplifier is also operated at a low filament voltage to increase tube life. It is practically desirable that the preamplifier H should be capable of operation for at least a year without requiring maintenance, so that it can be used in association with an ionization chamber in a radioactive area. The input impedance depends on the input resistor and the insulation of the input circuit to ground. All insulators in the input section of the preamplifier are made of teflon, and their surface leakage is kept low by keeping the preamplifier dry. This is accomplished by having the filaments of the two tubes in the preamplifier continuously energized.

The term "very high resistance," as used herein and in the appended claims in connection with the input or measuring resistor $R_1$, means that the resistance value of said resistor has a minimum value of not less than 100,000 ohms, and a maximum value of the order of 100,000 megohms.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In apparatus for measuring a minute unidirectional current developed between first and second terminals of a high impedance current source, the combination of a measuring circuit connected between said terminals and including an adjustable voltage source of relatively low resistance and comprising a slide wire resistor and a slider contact, and including a very high resistance connecting said slider contact to said first terminal and connected through said slider contact and said voltage source to the said second terminal, condenser means, a second resistor through which said condenser means is connected to said first source terminal, a vibrating condenser converter for converting unidirectional current into alternating current and connected between said second terminal and second resistor and connected by the latter to said first terminal, an alternating current amplifier having an input circuit connected at one end to said first source terminal through said condenser means and second resistor and having its other end connected to said second source terminal and having an output circuit, a reversible rebalancing motor connected to said output circuit for operation to adjust said slider contact and rebalance said measuring circuit when the latter is unbalanced, and a damping condenser having its terminals connected to the ends of said very high resistance.

2. A combination as specified in claim 1, in which the value of said very high resistance is not less than 100,000 ohms.

3. A combination as specified in claim 1, in which the value of said very high resistance is of the order of 100,000 megohms.

4. A combination as specified in claim 1, in which the vibrating condenser converter comprises a vibrating structure and electromagnetic means including connections to a current source supplying current of the same frequency to said electromagnetic means and to said amplifier and in which said structure has a resonant vibration frequency definitely different from the first mentioned frequency.

5. In apparatus for measuring a minute unidirectional current developed between first and second terminals of a high impedance current source including capacitance, the combination of a measuring circuit connected between said terminals and including an adjustable voltage source of relatively low resistance and comprising a slide wire resistor and a slider contact and including a very high resistance connecting said slider contact to said first source terminal and connected through said slider contact and said voltage source to the said second terminal, condenser means, a second resistor through which said condenser means is connected to said first source terminal, a vibrating condenser converter for converting unidirectional current into alternating current connected between said second terminal and second resistor and connected by the latter to said first terminal, an alternating current amplifier having an input circuit connected at one end to said first source terminal through said condenser means and having its other end connected to said second source terminal and having an output circuit, a reversible rebalancing motor connected to said output circuit for operation to adjust said slider contact and rebalance said measuring circuit when the latter is unbalanced, and a damping condenser having its terminals connected to the ends of said very high resistance and forming means of relatively low impedance for modifying the charge on said capacitance associated with said high impedance current source on a change in the value of the current developed in said source.

6. A combination as specified in claim 5, in which the capacity of said damping condenser is proportioned to the capacity of said capacitance so as to decrease the capacitance discharge period.

JAMES C. MOUZON.

References Cited in the file of this patent

UNITED STATES PATENTS

| Number | Name | Date |
| --- | --- | --- |
| 2,284,476 | MacKay | May 26, 1942 |
| 2,300,742 | Harrison et al. | Nov. 3, 1942 |